US008818124B1

(12) United States Patent  (10) Patent No.: US 8,818,124 B1
Kia  (45) Date of Patent: Aug. 26, 2014

(54) METHODS, APPARATUS, AND SYSTEMS FOR SUPER RESOLUTION OF LIDAR DATA SETS (75) Inventor: Omid E. Kia, North Bethesda, MD (US)

(73) Assignee: Exelis, Inc., McLean, VA (US)

(*) Notice: Subject to any disclaimer, the term of this patent is extended or adjusted under 35 U.S.C. 154(b) by 418 days.

(21) Appl. No.: 13/040,845

(22) Filed: Mar. 4, 2011

(51) Int. Cl.
G06K 9/40 (2006.01)
(52) U.S. Cl.
USPC ........ 382/254; 250/208.1; 345/420; 345/427; 345/672; 356/6; 382/100; 382/103; 382/154; 382/218; 382/305; 701/408; 701/414; 701/523; 701/533
(58) Field of Classification Search
None
See application file for complete search history.

(56) References Cited

U.S. PATENT DOCUMENTS

| | | | |
|---|---|---|---|
| 4,716,414 A | 12/1987 | Luttrell et al. | |
| 5,029,902 A * | 7/1991 | Komori | 283/56 |
| 5,166,878 A * | 11/1992 | Poelstra | 701/523 |
| 6,008,808 A * | 12/1999 | Almeida et al. | 715/767 |
| 6,442,293 B1 * | 8/2002 | Ito et al. | 382/154 |
| 6,664,529 B2 * | 12/2003 | Pack et al. | 250/208.1 |
| 7,003,177 B1 | 2/2006 | Mendlovic et al. | |
| 7,149,346 B2 * | 12/2006 | Oniyama | 382/154 |
| 7,215,430 B2 * | 5/2007 | Kacyra et al. | 356/601 |
| 7,310,440 B1 * | 12/2007 | Dolloff | 382/154 |
| 7,417,717 B2 | 8/2008 | Pack et al. | |
| 7,420,555 B1 * | 9/2008 | Lee | 345/424 |
| 7,933,395 B1 * | 4/2011 | Bailly et al. | 379/201.04 |
| 8,179,393 B2 * | 5/2012 | Minear et al. | 345/419 |
| 8,260,584 B2 * | 9/2012 | Adachi et al. | 703/1 |
| 2002/0060784 A1 * | 5/2002 | Pack et al. | 356/6 |
| 2004/0008269 A1 | 1/2004 | Zomet et al. | |
| 2004/0105573 A1 * | 6/2004 | Neumann et al. | 382/103 |
| 2004/0193441 A1 * | 9/2004 | Altieri | 705/1 |
| 2005/0216186 A1 * | 9/2005 | Dorfman et al. | 701/207 |
| 2006/0200311 A1 * | 9/2006 | Arutunian et al. | 701/210 |
| 2006/0200382 A1 * | 9/2006 | Arutunian et al. | 705/14 |
| 2006/0200383 A1 * | 9/2006 | Arutunian et al. | 705/14 |
| 2006/0200384 A1 * | 9/2006 | Arutunian et al. | 705/14 |
| 2007/0031064 A1 * | 2/2007 | Zhao et al. | 382/285 |
| 2007/0110338 A1 * | 5/2007 | Snavely et al. | 382/305 |
| 2008/0002914 A1 | 1/2008 | Vincent et al. | |
| 2008/0033641 A1 * | 2/2008 | Medalia | 701/209 |
| 2008/0043020 A1 * | 2/2008 | Snow et al. | 345/427 |
| 2008/0238919 A1 * | 10/2008 | Pack | 345/420 |
| 2009/0224962 A1 | 9/2009 | Pao et al. | |
| 2009/0232213 A1 | 9/2009 | Jia | |
| 2010/0046842 A1 * | 2/2010 | Conwell | 382/218 |
| 2010/0123737 A1 * | 5/2010 | Williamson et al. | 345/672 |

(Continued)

OTHER PUBLICATIONS

Park, Sung Cheol; Park, Min Kyu; Kang, Moon Gi. Super-Resolution Image Reconstruction: A Technical Overview, IEE Signal Processing Magazine, May 2003, pp. 21-36.

Farsiu, Sina; Robinson, Dirk; Elad, Michael; Milanfar, Peyman. "Advances and Challenges in Super-Resolution." University of California, Santa Cruz CA, The Technion-Israel Institute of Technology, Israel, Wiley Periodiacls Jan. 30, 2004.

(Continued)

Primary Examiner — Tsung-Yin Tsai
(74) Attorney, Agent, or Firm — Ratnerprestia (57) ABSTRACT Light detection and ranging (LIDAR) imaging systems, method, and computer readable media for generating super-resolved images are described. Super-resolved images are generated by obtaining data sets of cloud points representing multiple views of an object where the views have a view shift, enhancing the views by duplicating cloud points within each of the data sets, compensating for the view shift using the enhanced views, identifying valid cloud points, and generating a super-resolved image of the object by integrating valid cloud points within the compensated, enhanced views.

19 Claims, 6 Drawing Sheets (56) References Cited

U.S. PATENT DOCUMENTS

2010/0208937 A1* 8/2010 Kmiecik et al. ............ 382/100
2010/0299166 A1* 11/2010 Waupotitsch et al. ............ 705/7
2011/0181589 A1* 7/2011 Quan et al. .................... 345/420
2011/0286660 A1* 11/2011 Ofek et al. .................... 382/154

OTHER PUBLICATIONS

Schuon, Sebastion; Thobalt, Christian; Davis, James; Thrun, Sebastian. Lidarboost: Depth Superresolution for TOF 3D Shape Scanning, IEEE 2009, pp. 343-350.

Irani, Michael; Peleg, Shmuel, "Super Resolution From Image Sequences" IEEE 1990, pp. 115-120.

* cited by examiner

METHODS, APPARATUS, AND SYSTEMS FOR SUPER RESOLUTION OF LIDAR DATA SETS

BACKGROUND OF THE INVENTION

Light detection and ranging (LIDAR) systems generate an image of an object such as a landscape or building by illuminating the object with precisely timed pulses of light, capturing portions of the light reflected by the object, and assembling the captured portions to generate the image. The captured portions of light represent a view of the object. Often, multiple views of the object are combined into a single image having a level of resolution that is superior to an image that could be generated from a single view.

SUMMARY OF THE INVENTION

The present invention is embodied in light detection and ranging (LIDAR) imaging systems, methods, and computer readable media for generating super-resolved images. Super-resolved images are generated by obtaining data sets of cloud points representing multiple views of an object where the views have a view shift, enhancing the views by duplicating cloud points within each of the data sets, compensating for the view shift using the enhanced views, identifying valid cloud points, and generating a super-resolved image of the object by integrating valid cloud points within the compensated, enhanced views.

DETAILED DESCRIPTION OF THE INVENTION

Figure 1:
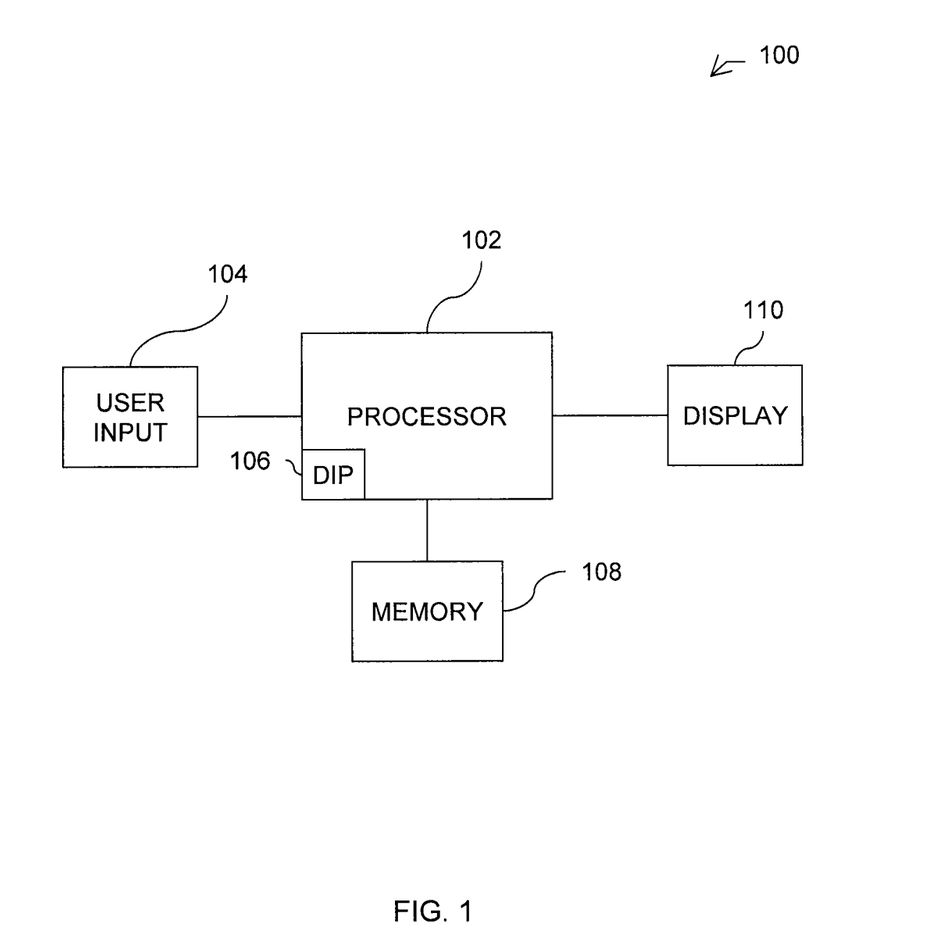
FIG. 1 is a block diagram of an exemplary system for processing LIDAR data sets in accordance with an aspect of the present invention.

FIG. 1 depicts an imaging system 100 for processing LIDAR data sets. The illustrated system 100 includes a processor 102; and a user input device 104, a data input port 106, a memory 108, and a display 110 coupled to the processor 102. Processor 102 may be configured in a conventional manner to receive user commands via user input device 104, receive data via input port 106, store information in memory 108, retrieve information from memory 108, and present information on display 110.

Processor 102 may be a conventional processor such as a personal computer, mainframe computer, laptop, desktop, or essentially any device capable of processing data and instructions. User input device 104 may be a conventional device such as a mouse, keyboard, joy stick, or essentially any device capable of providing user input. Data input port 106 may be a conventional data reception/transmission port such as a universal serial bus (USB), a computer readable medium device such as a disk drive, or essentially any type of port/device by which the processor 102 can receive information or send information. Memory 108 may be conventional memory such as random access memory (RAM). Display 110 may be a conventional display such as a computer terminal, liquid crystal display, cathode ray tube, or essentially any device capable of visually presenting information. Suitable processors, memory, data input devices, and display for use with the present invention will be understood by one of skill in the art from the description herein.

LIDAR systems generate LIDAR data sets representing views of objects such as landscapes, buildings, vehicles, etc. The data sets may be generated using a conventional LIDAR imaging system, e.g., being transported over a landscape by an airplane or being directed at a building by a ground transportation vehicle. Often multiple views of the same object will be captured with a shift in the captured data intentionally introduced or as a result of fluctuations inherent in the LIDAR imaging systems. The generation of LIDAR data sets for multiple views of an object are well known. The present invention processes these generated LIDAR data sets from multiple views to generate images having a higher resolution that images generated from multiple views (i.e., the images are "super-resolved").

In a general overview of an exemplary embodiment, data sets of cloud points from multiple views are stored in memory 108. As used herein, the term cloud point refers to a collection of data representing a location (e.g., in Cartesian or Polar coordinate system format) and at least one other parameter such as time of flight for a laser beam from transmission until a reflection is detected. Each view represents a view of an object. The processor 102 obtains the data sets from the memory 108, enhances the plurality of views by duplicating cloud points within each of the data sets, compensates for the at least one view shift using the enhanced plurality of views, identifies valid cloud points, generates a super-resolved image of the object by integrating valid cloud points within the compensated, enhanced plurality of views, and presents the super-resolved image on the display 110. Additional details regarding the functionality of the processor 102 are described in further detail below.

When the plurality of views are captured from a rectangular scan pattern (described in further detail below), the processor 102 is configured to enhance the plurality of views by duplicating the cloud points within each of the data sets by a constant amount. When the plurality of views are captured from an elliptical scan patter (also described in further detail below), the processor 102 is configured to enhance the plurality of views by duplicating the cloud points within each of the data sets by an amount that varies from the center to the periphery of each of the plurality of views. The processor 102 may be configured to generate the super-resolved image by integrating valid cloud points by averaging the valid cloud points within the compensated, enhanced plurality of views.

Figure 2:
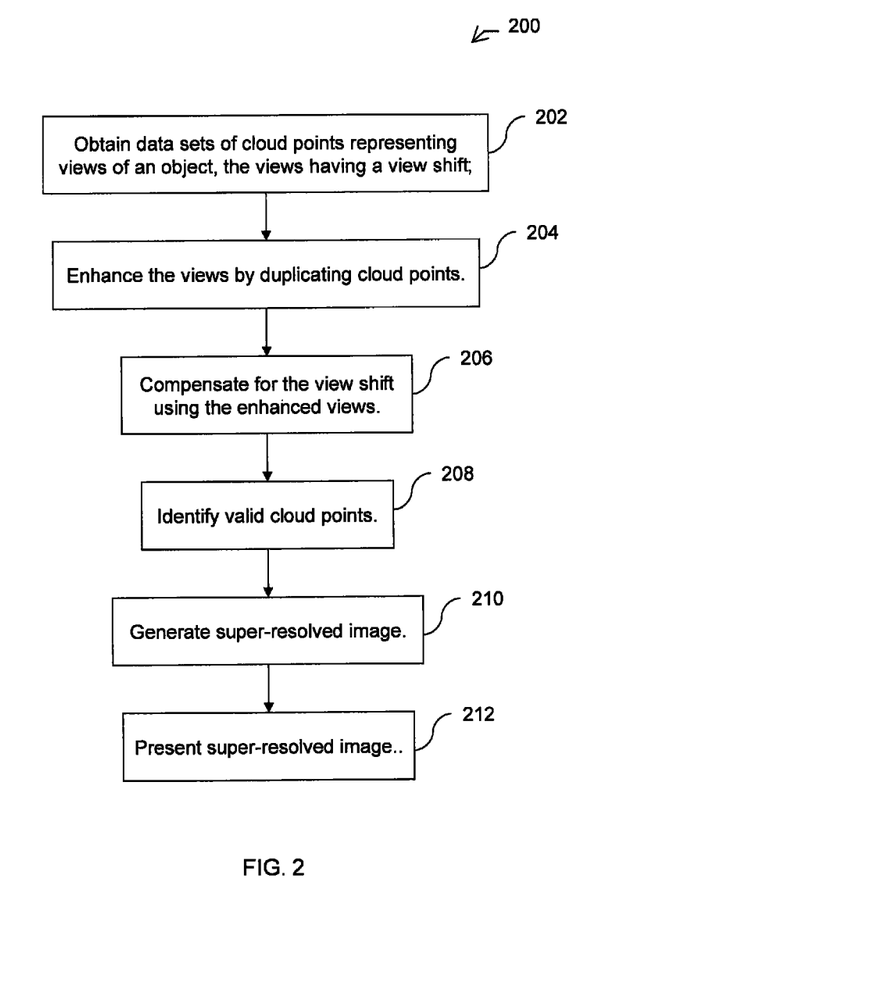
FIG. 2 is a flow chart of exemplary steps for generating a super-resolved image from LIDAR data sets in accordance with aspects of the present invention.

FIG. 2 depicts a flow chart 200 of exemplary steps for generating a super-resolved image from LIDAR data sets. To facilitate description, imaging system 100 is used to describe the various steps in flow chart 200. Other systems and devices for carrying out the steps in flow chart 200 will be understood by one of skill in the art from the description herein.

At block 202, data sets of cloud points representing multiple views of an object are obtained. In an exemplary embodiment, each view may be obtained in a known manner by directing a laser at an object, such as a landscape or building and recording the light reflected by the object with an imaging device such a charge coupled device (CCD) array. The laser may be scanned over the object multiple times to obtain data sets of cloud points for multiple views of the same object. In an exemplary embodiment, the multiple views have at least one view shift with respect to one another, which is preferably a non-integer pixel amount of the CCD array.

In an exemplary embodiment, the data sets may be stored in memory 108 and processor 102 may obtain the data sets from memory 108. In an alternative exemplary embodiment, processor 102 may obtain the data sets from another location via data input port 106.

Figure 3A:
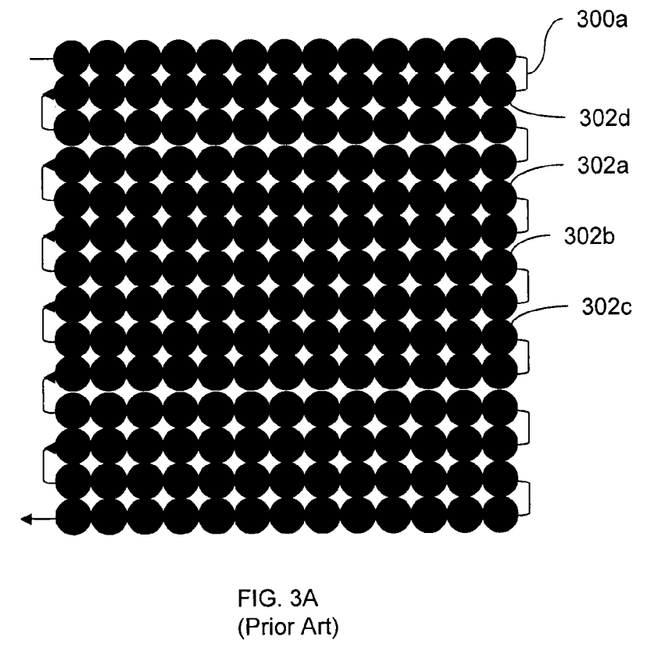
FIG. 3A is an illustrative diagram of a prior art LIDAR scan pattern.
Figure 3B:
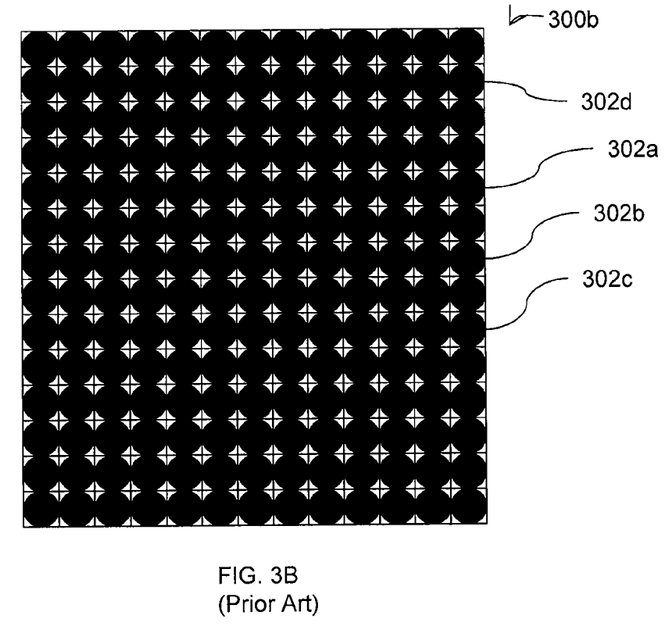
FIG. 3B is an illustrative diagram of a prior art LIDAR blast pattern.

FIG. 3A depicts a prior art scan pattern 300a for directing a pulsed laser at an object where each pulse of the laser is represented by a dot (see, for example, dots 302a, b, c, and d). Ideally, each laser pulse reflection is captured and the time between when the laser pulse is sent and when the reflection is captured is recorded, i.e., time of flight (tof). Typically, spatial ambiguity between detected points is large and/or many laser return pulses are not captured, which contributes to the ambiguity of the detected information and lowers the resolution of the individual views. FIG. 3B depicts a prior art blast pattern 300b in which all pulses are sent substantially simultaneously.

Figure 3C:
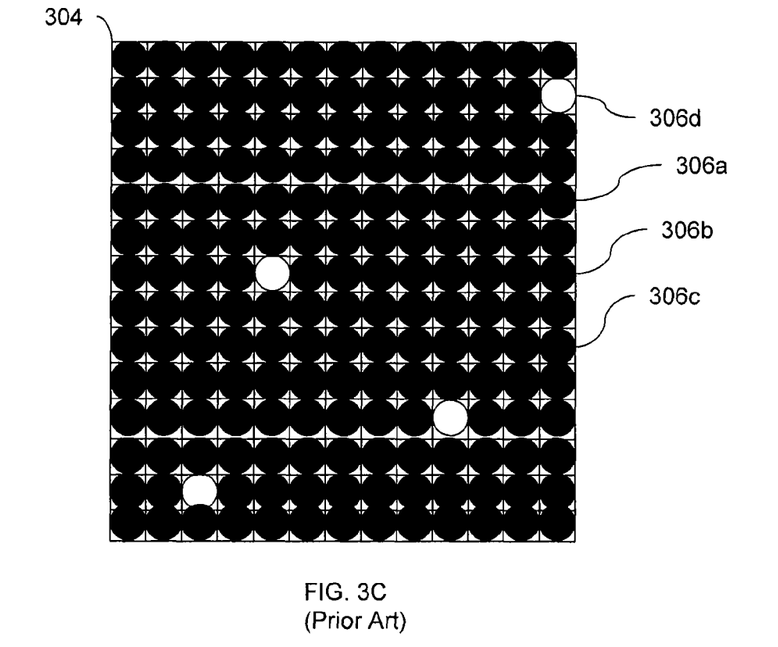
FIG. 3C is an illustrative diagram of a prior art imaging device capturing reflections of the LIDAR scan pattern of FIG. 3A by an object to generate a view of the object.
Figure 3D:
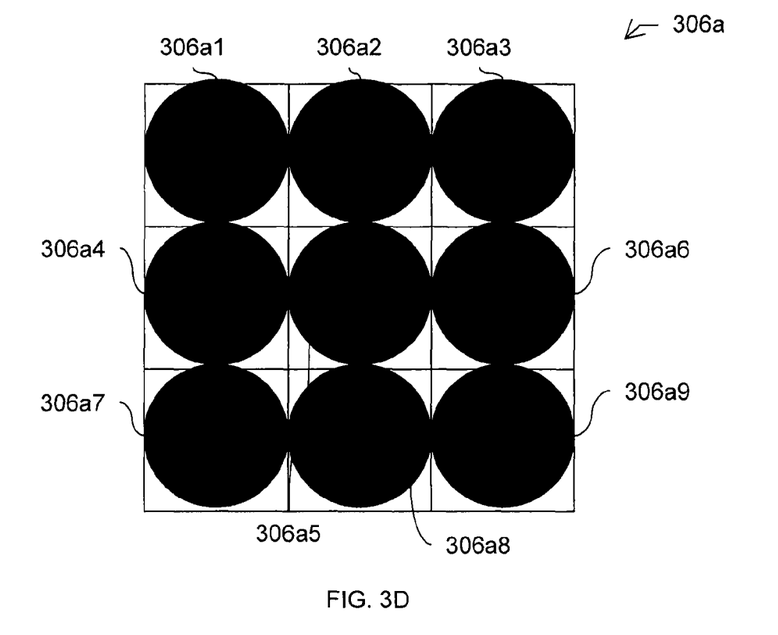
FIG. 3D is an illustrative representation of a captured data point from FIG. 3B after enhancement in accordance with aspects of the present invention.

FIG. 3C depicts a prior art CCD array 304 capturing reflections by the object of the laser pulses (represented by dots 302 in FIGS. 3A and 3B). Each reflection captured is represented by a filled dot (see, for example, dots 306a, b, c) and each reflection not captured is represented by a unfilled dot (see, for example, dot 306d). Each dot represents a two dimensional location component corresponding to the object area being imaged and a distance component corresponding to the time of flight from the laser to the object and back (i.e., a "cloud point").

Figure 4:
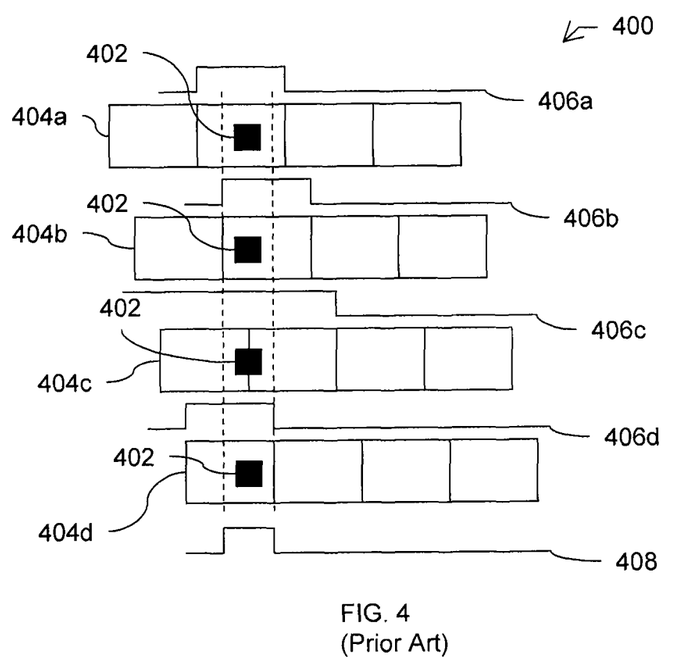
FIG. 4 is an illustrative representation of the combination of multiple views in accordance with the prior art.

FIG. 4 depicts a prior art system for capturing a plurality of views (views 404a, b, c, and d) of an object such as a landscape. In this example, each view is captured with a four pixel imaging system (e.g., a camera) and includes a block 402 within the object that is smaller than each pixel of the imaging system. Each view has a view shift with respect to the other views. Respective timing diagrams 406a, b, c, and d from each view illustrate that by combing the views the object can be better resolved (see combined timing diagram 408). In other words, from the series of scenes, the ambiguity in the block 402 is resolved by observing the leftmost edge in the second view 404b and the right most edge of in the fourth view. In reality, the square super-resolved square detection timing diagram 408 is a bell shaped curve. Coherent integration of signals across views such as illustrated in FIG. 4 poses a special problem for LIDAR datasets due to limitations in the resolution across the captured plane, e.g., ground plane (x-axis and y-axis), as opposed to the distance measurements (z-axis) and quantum conversion inefficiencies in transmitting and receiving photons. Additionally, during perspective scanning, LIDAR systems have difficulty representing non-illuminated sides of objects, e.g., walls of buildings on the illuminated side receive and reflect laser pulses to generate a much higher level of detail than the walls that are in the illumination shadows, which receive little or no laser pulses and generate little or no detail. This type of perspective scanning can provide a set of point clouds for a cavity whereby after ground cover correction there may exists multiple z-axis values for a given pair of (x,y) coordinates across multiple cloud points due to the angles at which the laser pulses impact the cavity throughout the scanning. Further, some linear mode LIDAR systems develop multiple return values for the same coordinate location (x,y pair), which systems such as illustrated in FIG. 4 do not address. For example, LIDAR with canopy penetrating functionality develops multiple return values for a single coordinate location—essentially providing multiple profile layers for a scanned area (e.g., a tree canopy layer and a ground layer under the canopy layer).

Referring back to FIG. 2, at block 204, each of the multiple views are enhanced by duplicating cloud points within each of the data sets. The amount of duplication is analogous to the increased level of resolution that is targeted. In an exemplary embodiment, processor 102 enhances the multiple views. In one embodiment, the multiple views including rectangular cloud points captured from a rectangular scan pattern such as depicted in FIG. 3A. In other embodiments, the multiple views included other types of cloud point relationships such as those captured from an elliptical scan pattern (not shown) or other type of scan pattern.

In embodiments where the scan pattern in uniformly spaced and captured (such as depicted in FIGS. 3A and 3B), each cloud point within each view may be duplicated by the same integer amount. FIG. 3C depicts the duplication of a cloud point 306a nine times to create cloud points 306a1, a2, a3, a4, a5, a6, a7, a8, and a9. It will be understood by one of skill in the art herein that the integer may be more or fewer than nine. Suitable integer amounts will be understood by one of skill in the art from the description herein.

In embodiments where the scan pattern in not uniformly spaced and captured, cloud points within the data sets may be non-uniformly duplicated. For example, in elliptical scan pattern systems, cloud points may be duplicated within each of the data sets of each of the multiple views by an amount that varies from the center (where cloud points have a higher concentration) to the periphery (where cloud points have a lower concentration) in order to adequately fill in spaces between the cloud points.

At block 206, view shifts are compensated for using the enhanced views. In an exemplary embodiment, processor 102 compensates for the view shifts. In embodiments where the view shifts between multiple views is known, the views are shifted by the known shifts to register the views with respect to one another. Embodiments where the view shifts are not known are described below with reference to FIG. 5.

Figure 5:
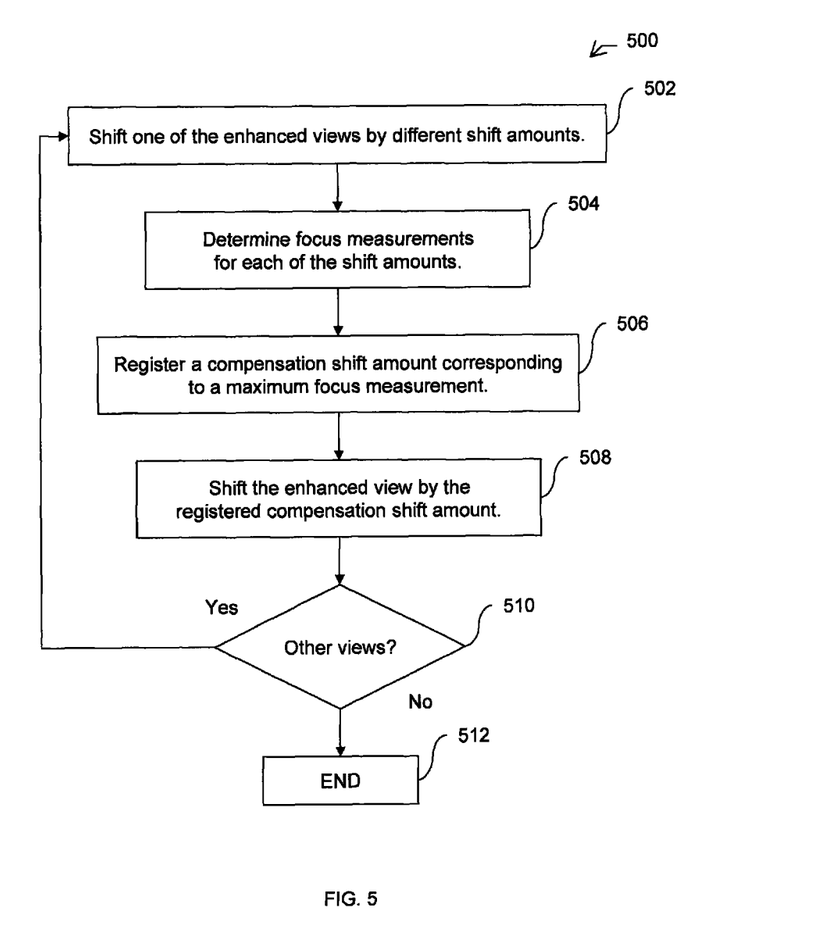
FIG. 5 is a flow chart of exemplary steps for shifting enhanced views of an object to accommodate for view shift in accordance with aspects of the present invention.

FIG. 5 depicts a flow chart 500 of exemplary steps for compensating for view shifts where the view shifts are unknown. In an exemplary embodiment, each step of flow chart 500 is performed by processor 102. Compensation is performed by parametrically modeling variations between views and further scanning a neighborhood of those parameters for the best compensation to result in an enhanced view. For the case of a simple moving camera or object, the parameters are simply spatial shift. A technique to estimate the shifts that result in the best view, which is enhanced from a single view, brings the enhanced view in focus whereas an incorrect estimation would provide a less focused view. For the case of a zooming camera whereby the view does not undergo a shift but rather a scale, the scale is estimated and multiple views are combined for a better rendition.

At block 502, one of the enhanced views is shifted with respect to another one of the enhanced views by different shift amounts. The shift amounts may be in one or multiple directions. In one embodiment, the views are shifted in the plane of the view (e.g., in the x-axis and y-axis directions). In other embodiment, the shift amounts may be along an axis perpendicular to the plane of the views (e.g., in the z-axis to accommodate for zoom) in addition to or instead of shifts within the plane of the views. In other embodiments, the shifts may additionally include degrees of rotation about the x-axis, y-axis, and/or z-axis (e.g., pitch, yaw, and/or roll).

At block 504, focus measurements are determined between the one enhanced view and the other enhanced view for each of the shift amounts and, at block 506, a compensation shift amount is registered that corresponds to a maximum one of the determined focus measurements. In an exemplary embodiment, the compensation shift amount is determined by (1) identifying a prominent feature common to the one enhanced view and the other enhanced view using known image processing algorithms, (2) overlaying the enhanced views, (3) shifting one of the enhanced views until an edge of the prominent feature has the maximum contrast, and (4) identifying the shift producing the maximum contrast as the compensation shift amount.

At block 508, the one enhanced view is shifted by the compensation shift amount to register the one enhanced view with respect to the other enhanced view.

At block 510, if other non-compensation shift views are present, processing proceeds at block 502 with another view. Otherwise, processing ends at block 512

The flowchart 500 of FIG. 5 depicts one embodiment of the present invention for optimizing shifts between views in which the shifts across multiple views are corrected for serially. In other embodiments of the present invention, view shifts across multiple views are corrected in parallel. Suitable parallel processing algorithms will be understood by one of skill in the art from the description herein.

Referring back to FIG. 2, at block 208, valid cloud points are identified. In an exemplary embodiment, processor 102 identifies valid cloud points. In one embodiment, valid cloud points may be identified by identifying cloud points with valid values such as time of flight values within an expected range. In another embodiment, valid cloud points may be identified by identifying invalid cloud points for non-use. Invalid cloud points may be identified by the presence of invalid values such as time of flight values outside an expected range. The processor 102 may stored the valid or invalid cloud point positions as a use mask or a don't use mask, respectively, in memory 108.

At block 210, a super-resolved image of the object is generated by integrating valid cloud points within the compensated, enhanced views. Thus, only data from valid (i.e., detected) cloud points weighted by the number of detections are used to coherently integrate the multiple views. For example, if at a particular spatial coordinate there exist 5 valid point clouds out of 10 views (e.g., for a side of a building in which the side was illuminated in only 5 of the views) then only those 5 points are used to resolve the view. If a spatial coordinate point does not have any valid point cloud data, the result receives no resultant cloud point and if a coordinate point has all 10 valid points then the resultant will use all 10 points. Neighboring points in a point cloud from the resultant process can carry values based on a variable amount of input point clouds. For example, one coordinate point may have 8 valid points that are integrated to obtain the final result and an adjacent coordinate point may have only 5 valid points that are integrated to obtain the final result. In an exemplary embodiment, processor 102 generates the super-resolved image by applying a mask retrieved from memory 108 for each view to the respective views and integrating the valid cloud points from the respective views. In one embodiment, the processor 102 may retrieve use masks for each view from memory 108 and only utilize the cloud points identified in the use mask for integration. In another embodiment, the processor 102 may retrieve don't use masks for each view from memory 108 and only utilize the cloud points not identified in the don't use mask for integration. Integration may be performed by averaging the valid cloud points at each location within the compensated, enhanced plurality of views. Integration may utilize the minimum valid cloud points within the compensated, enhanced plurality of views or the median of the valid cloud points within the compensated, enhanced plurality of views.

At block 212, the super-resolved image is presented on a display. In an exemplary embodiment, processor 102 presents the super-resolved image on display 110.

The present invention may be applied to LIDAR systems in which one or multiple values are obtained at the coordinate locations. In linear LIDAR systems in which multiple values are obtained at the coordinate locations (e.g., for a canopy layer and for an underlying ground layer below the canopy layer), a volume of points is effectively obtained in which 3-dimensional slices within the volume represent different layers. The edges of one of the slices can be used to capture the shift; and the captured shift can be used to compensate not only for the shift experienced by the slice, but for the other slices within the volume as well. For example, shifts associated with one layer (e.g., the canopy layer) may be obtained (e.g., as described above with reference to block 206) and, then, these obtained shifts for this layer may be used to compensate for shifts in other layers (e.g., for the ground layer). Thus, computational processing may be used more efficiently since the shifts only need to be determined for one layer rather than for each of the multiple layers.

It is contemplated that one or more of the various components and steps described above may be implemented through software that configures a computer to perform the function of these components and/or steps. This software may be embodied in a computer readable medium, for example, a magnetic disc, an optical disk, a memory-card, or other tangible computer readable medium capable of storing instructions.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A light detection and ranging (LIDAR) imaging method comprising:
   obtaining data sets of cloud points representing each of a plurality of views of an object, the plurality of views having at least one view shift;
   enhancing the plurality of views by duplicating cloud points within each of the obtained data sets;
   compensating for the at least one view shift using the enhanced plurality of views by;
      shifting one of the enhanced plurality of views with respect to an other one of the enhanced plurality of views by a plurality of different shift amounts,
      determining focus measurements between the one of the enhanced plurality of views and the other one of the enhanced plurality of views for each of the plurality of different shift amounts,
      registering a compensation shift amount from the plurality of different shift amounts corresponding to a maximum one of the determined focus measurements, and
      shifting the one of the enhanced plurality of views by the registered compensation shift amount;
   identifying valid cloud points; and generating a super-resolved image of the object from the compensated, enhanced plurality of views with a processor by integrating the valid cloud points located at each of a plurality of spatial coordinates within the compensated, enhanced plurality of views.

2. The method of claim 1, wherein the data sets are stored in a computer memory and the obtaining comprises:
retrieving the data sets from the memory.

3. The method of claim 1, wherein the plurality of views are rectangular and the enhancing step comprises:
duplicating the cloud points within each of the data sets by a constant amount.

4. The method of claim 1, wherein the plurality of views are elliptical and the enhancing step comprises:
duplicating the cloud points within each of the data sets by an amount that varies from the center to the periphery of each of the plurality of views.

5. The method of claim 1, wherein the at least one view shift is known and the compensating comprises:
shifting at least one of the enhanced plurality of views by the known shift amount.

6. The method of claim 1, wherein the identifying comprises:
identifying the valid cloud points within the enhanced plurality of views.

7. The method of claim 1, wherein the identifying step comprises:
identifying invalid cloud points to identify the valid cloud points.

8. The method of claim 1, wherein the generating comprises:
integrating valid cloud points by averaging the valid cloud points within the compensated, enhanced plurality of views.

9. The method of claim 1, wherein the generating step comprises:
integrating valid cloud points by determining the minimum of the valid cloud points within the compensated, enhanced plurality of views.

10. The method of claim 1, wherein the generating step comprises:
integrating valid cloud points by determining the median of the valid cloud points within the compensated, enhanced plurality of views.

11. The method of claim 1, further comprising:
presenting the super-resolved image on a display.

12. A light detection and ranging (LIDAR) imaging system comprising:
a memory including data sets of cloud points representing each of a plurality of views of an object, the plurality of views having at least one view shift;
a display; and
a processor coupled to the memory and the display, the processor configured to obtain the data sets from the memory, enhance the plurality of views by duplicating cloud points within each of the obtained data sets, compensate for the at least one view shift using the enhanced plurality of views, identify valid cloud points, generate a super-resolved image of the object from the compensated, enhanced plurality of views with a processor by integrating the valid cloud points located at each of a plurality of spatial coordinates within the compensated, enhanced plurality of views, and present the super-resolved image on the display;
wherein the processor is configured to shift one of the enhanced plurality of views with respect to another one of the enhanced plurality of views by a plurality of different shift amounts, determine focus measurements between the one of the enhanced plurality of views and the other one of the enhanced plurality of views for each of the plurality of different shift amounts, register a compensation shift amount from the plurality of different shift amounts corresponding to a maximum one of the determined focus measurements; and shift the one of the enhanced plurality of views by the registered compensation shift amount in order to compensate for the at least one view shift.

13. The system of claim 12, wherein the plurality of views are rectangular and the processor is configured to enhance the plurality of views by duplicating the cloud points within each of the data sets by a constant amount.

14. The system of claim 12, wherein the plurality of views are elliptical and the processor is configured to enhance the plurality of views by duplicating the cloud points within each of the data sets by an amount that varies from the center to the periphery of each of the plurality of views.

15. The system of claim 12, wherein the processor is configured to generate the super-resolved image by integrating valid cloud points by averaging the valid cloud points within the compensated, enhanced plurality of views.

16. A non-transitory computer readable medium including instructions for configuring a computer to perform a light detection and ranging (LIDAR) imaging method, the method comprising:
obtaining data sets of cloud points representing each of a plurality of views of an object, the plurality of views having at least one view shift;
enhancing the plurality of views by duplicating cloud points within each of the obtained data sets;
compensating for the at least one view shift using the enhanced plurality of views by;
shifting one of the enhanced plurality of views with respect to an other one of the enhanced plurality of views by a plurality of different shift amounts,
determining focus measurements between the one of the enhanced plurality of views and the other one of the enhanced plurality of views for each of the plurality of different shift amounts,
registering a compensation shift amount from the plurality of different shift amounts corresponding to a maximum one of the determined focus measurements, and
shifting the one of the enhanced plurality of views by the registered compensation shift amount,
identifying valid cloud points; and
generating a super-resolved image of the object from the compensated, enhanced plurality of views with a processor by integrating the valid cloud points located at each of a plurality of spatial coordinates within the compensated, enhanced plurality of views.

17. The non-transitory computer readable medium of claim 16, wherein the plurality of views are rectangular and the enhancing step comprises:
duplicating the cloud points within each of the data sets by a constant amount.

18. The non-transitory computer readable medium of claim 16, wherein the plurality of views are elliptical and the enhancing step comprises:
duplicating the cloud points within each of the data sets by an amount that varies from the center to the periphery of each of the plurality of views.

19. The non-transitory computer readable medium of claim 16, wherein the generating comprises:
integrating valid cloud points by averaging the valid cloud points within the compensated, enhanced plurality of views.

* * * * *